United States Patent [19]

Sugiura et al.

[11] Patent Number: 5,668,849
[45] Date of Patent: Sep. 16, 1997

[54] METHOD OF MANUFACTURING A ROTATING ANODE X-RAY TUBE

[75] Inventors: Hiroyuki Sugiura, Tochigi-ken; Katsuhiro Ono, Utsunomiya; Hidero Anno, Ootawara, all of Japan

[73] Assignee: Kabushiki Kaisha Toshiba, Japan

[21] Appl. No.: 621,705

[22] Filed: Mar. 26, 1996

Related U.S. Application Data

[63] Continuation of Ser. No. 282,486, Aug. 1, 1994, abandoned, which is a continuation of Ser. No. 7,894, Jan. 22, 1993, abandoned.

[30] Foreign Application Priority Data

Jan. 24, 1992 [JP] Japan .................... 4-010440

[51] Int. Cl.$^6$ .................................. H01J 35/10
[52] U.S. Cl. .................. 378/133; 378/132; 378/125
[58] Field of Search ........................ 378/132, 133

[56] References Cited

U.S. PATENT DOCUMENTS

| 4,210,371 | 7/1980 | Gerkema et al. |
|---|---|---|
| 4,501,566 | 2/1985 | Carlson et al. |
| 5,189,688 | 2/1993 | Ono et al. ................ 378/133 |
| 5,210,781 | 5/1993 | Ono et al. ................ 378/133 |

FOREIGN PATENT DOCUMENTS

| 0141475 | 5/1985 | European Pat. Off. |
|---|---|---|
| 0488311 | 6/1992 | European Pat. Off. |

OTHER PUBLICATIONS

Philips Technical Review vol. 44, No. 11/12, Nov. 1989 pp. 357–363 E. A. Muijderman et al.

*Primary Examiner*—Craig E. Church
*Attorney, Agent, or Firm*—Cushman Darby & Cushman Intellectual Property Group of Pillsbury Madison & Sutro, LLP

[57] ABSTRACT

In a rotating anode X-ray tube of this invention, a liquid metal lubricant supplied to bearing portions between a rotary member and a stationary member for instructing rotation of the rotary member is to be filled to a volume having a range of lower limit being an amount to fill bearing gaps, including helical grooves, and as an upper limit being 70% of the capacity of the interior in which the lubricant can flow, measured from the end portion of a helical groove slide bearing portion closest to the interior of a vacuum container. In the rotating anode X-ray tube, leakage of the liquid metal lubricant can be prevented, and a stable bearing operation can be maintained.

4 Claims, 15 Drawing Sheets

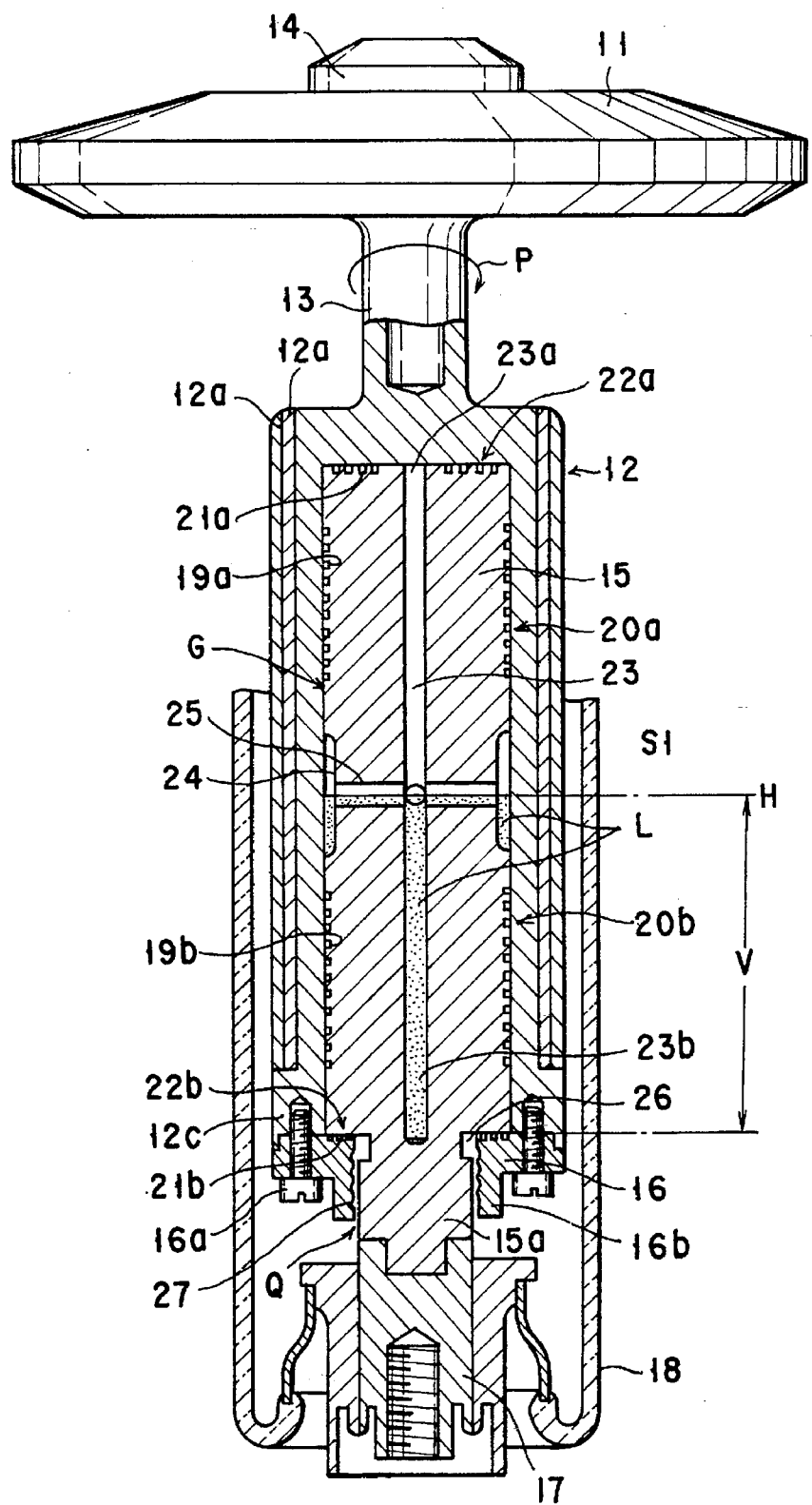
F I G. 1

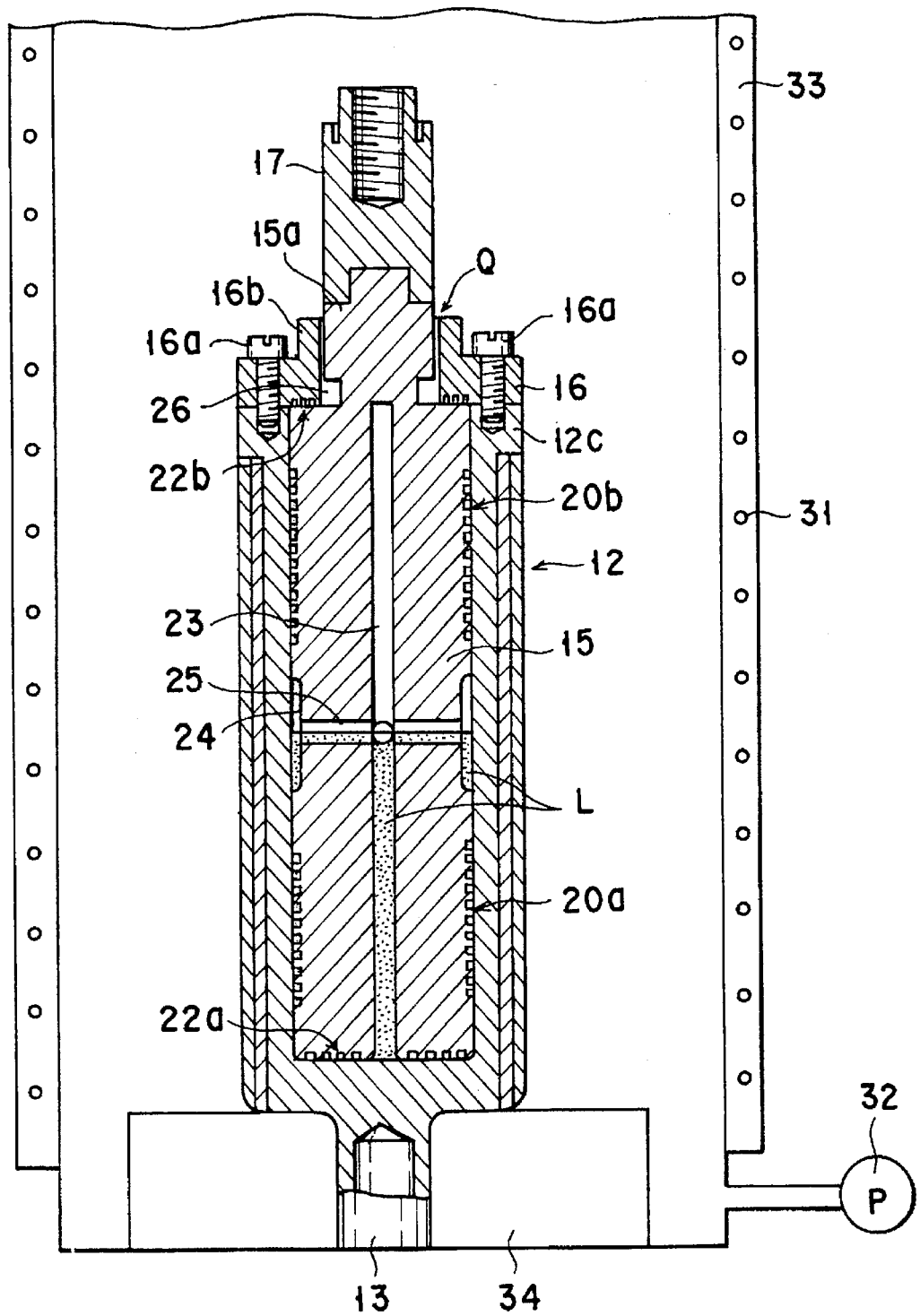
F I G. 6

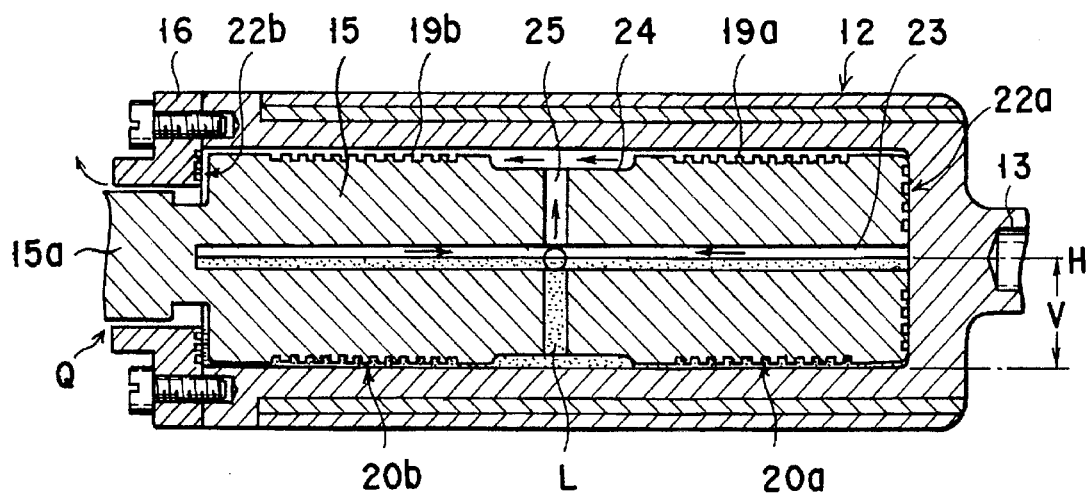
F I G. 11
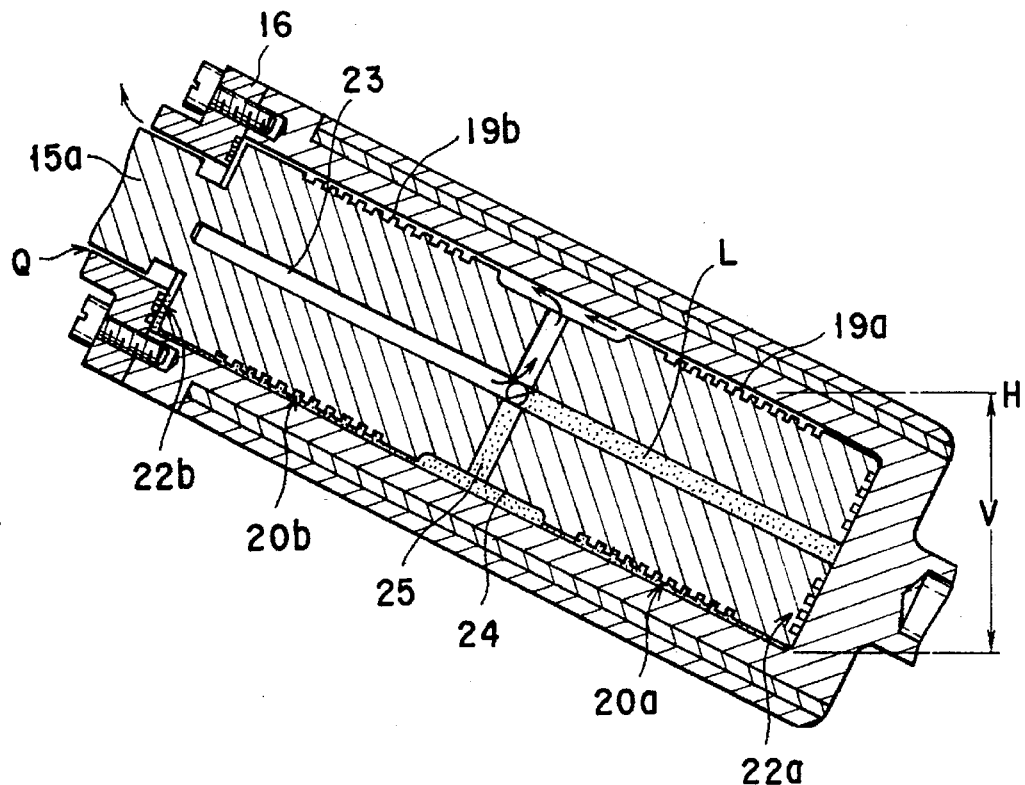
F I G. 12

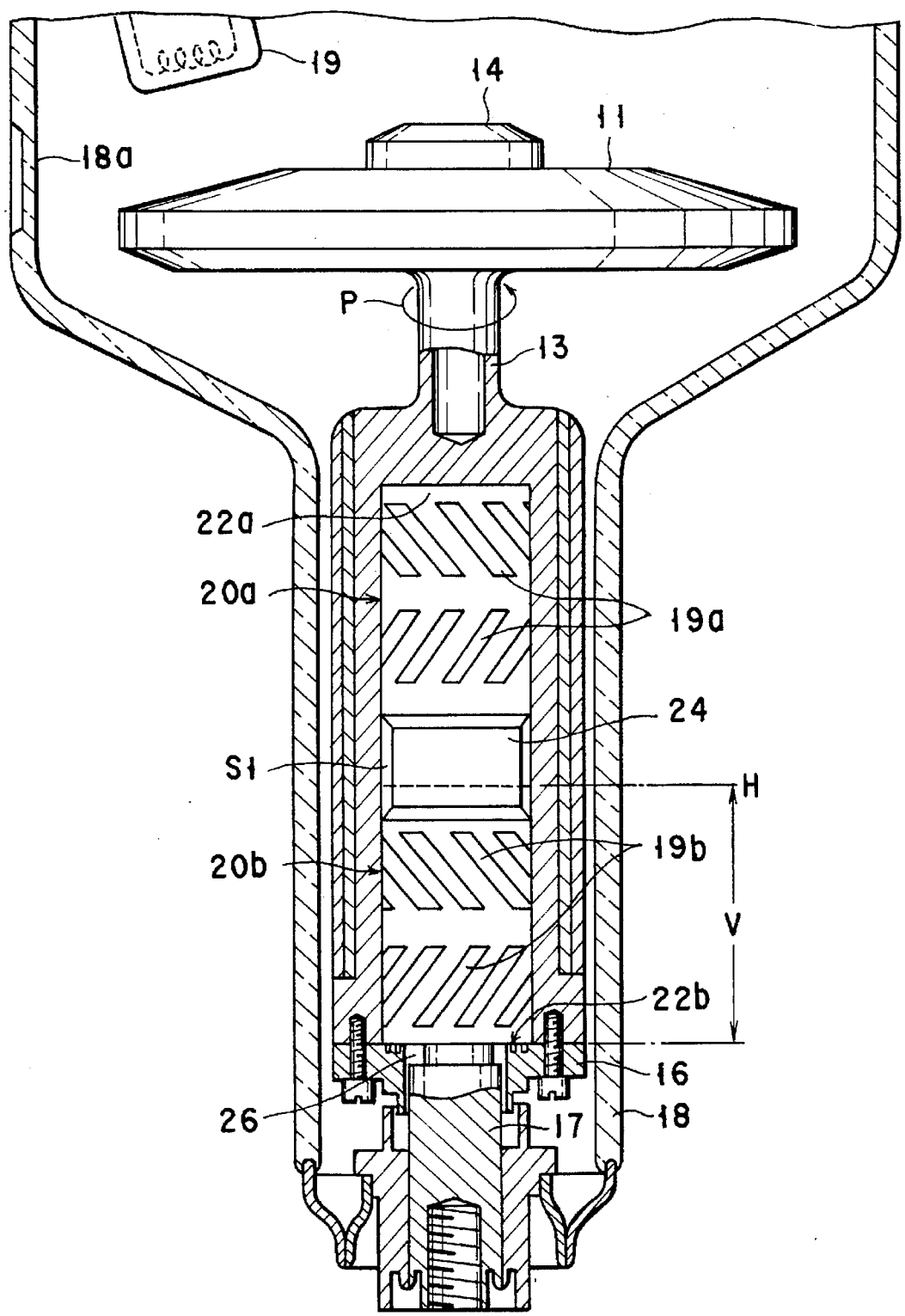
F I G. 15

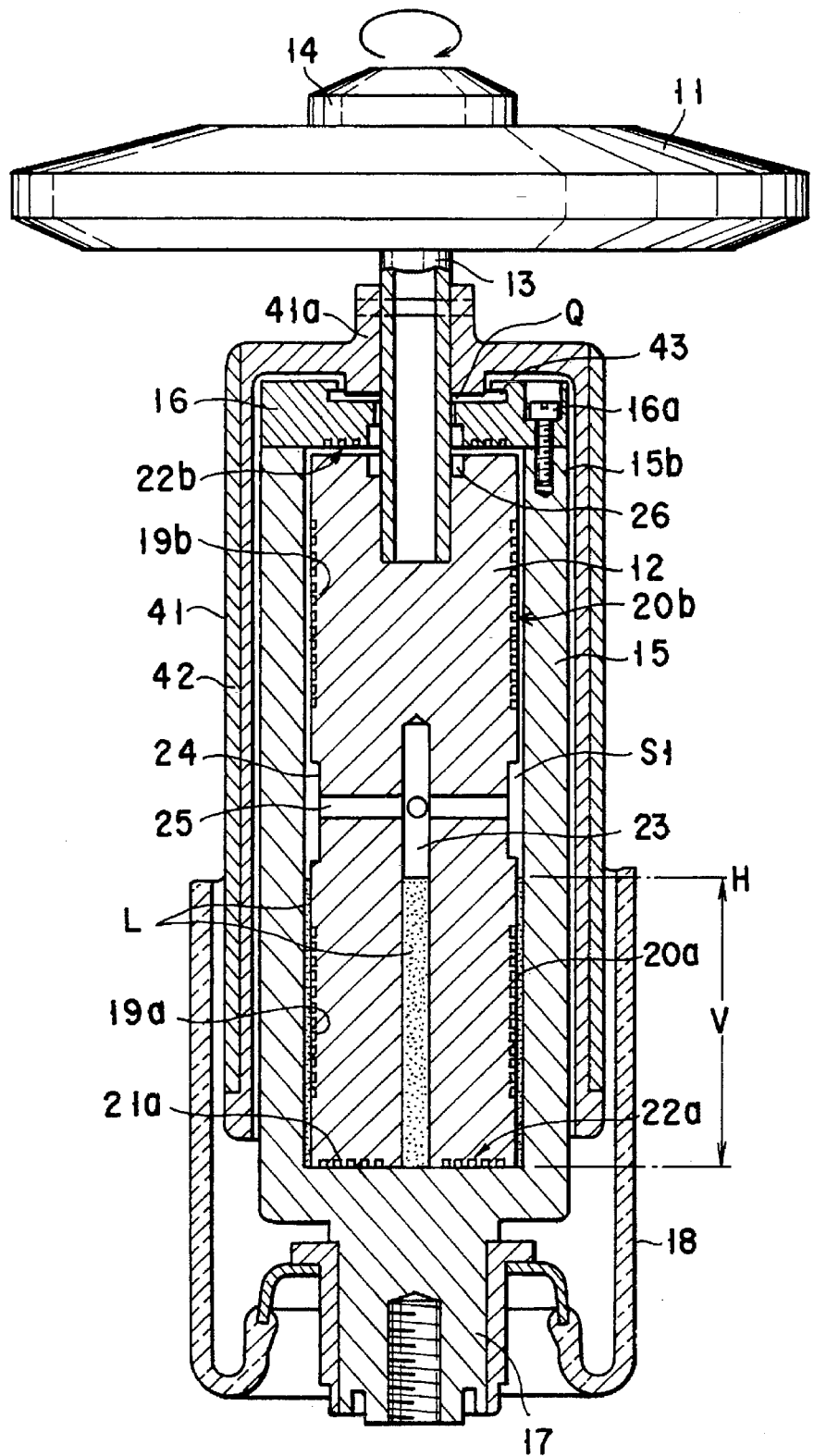
F I G. 16

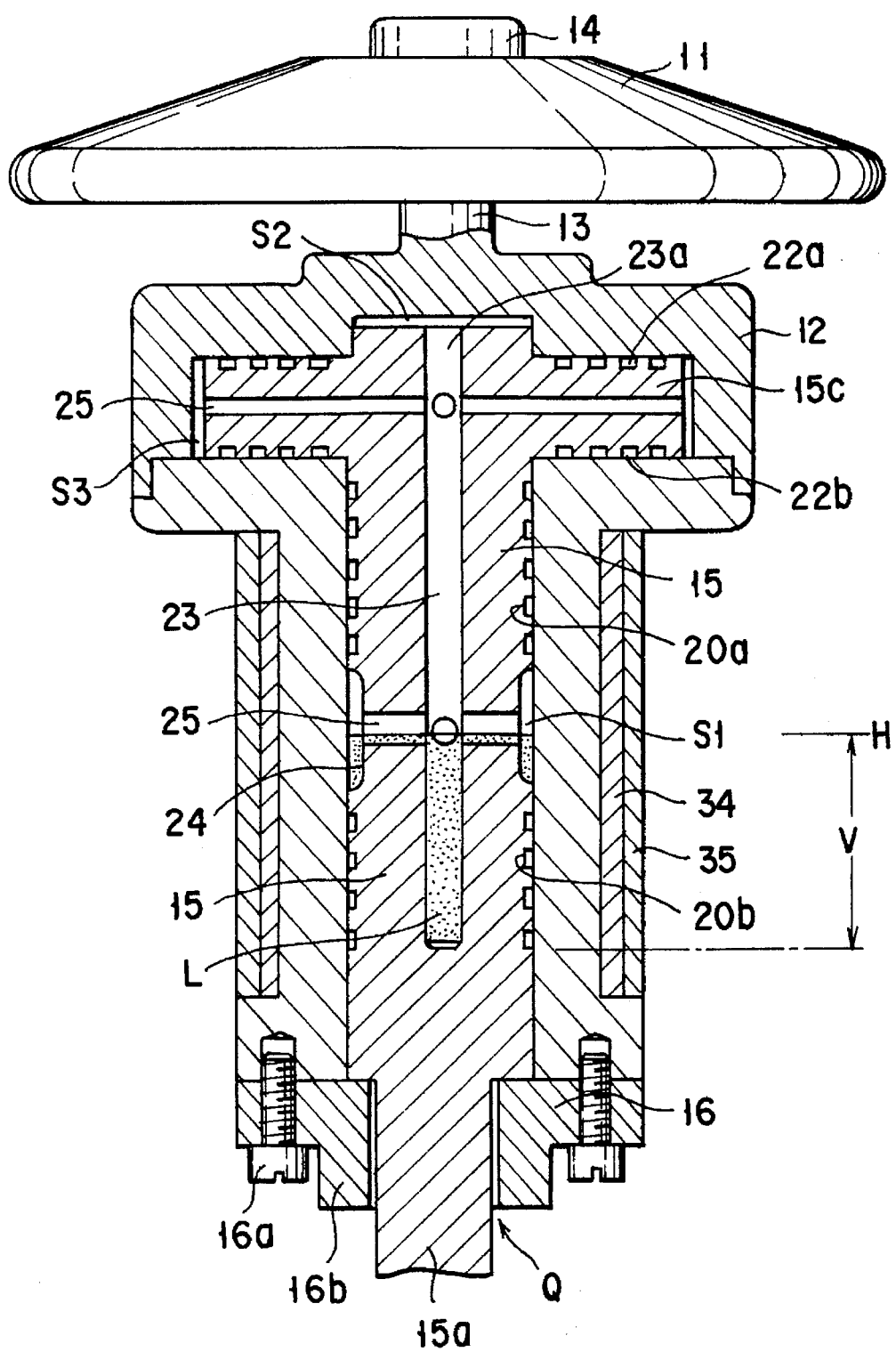
F I G. 17

METHOD OF MANUFACTURING A ROTATING ANODE X-RAY TUBE

This is a continuation of application Ser. No. 08/282,486, filed on Aug. 1, 1994, now abandoned which was abandoned upon the filing hereof which was a continuation of 08/007,894 filed Jan. 22, 1993, now abandoned.

BACKGROUND OF THE INVENTION

1. Field of the Invention

The present invention relates to a rotating anode X-ray tube a method of manufacturing the rotating anode X-ray tube and, more particularly, to the bearing structure of the rotating anode X-ray tube.

2. Description of the Related Art

As is well known, in a rotating anode X-ray tube, a disk-like anode target is supported by rotary and stationary structures having bearing portions. The electromagnetic coil of a stator disposed outside the vacuum envelope is energized to rotate the rotary structure fixed on the anode target at a high speed. The electron beam emitted from a cathode bombards the surface of the anode target, so that the anode target irradiates X-rays. Each bearing portion is constituted by a roller bearing, e.g., a ball bearing, or a dynamic pressure type slide bearing having a bearing surface formed with helical grooves and a liquid metal lubricant, e.g., Ga or a gallium—indium—tin (Ga—In—Sn) alloy, filling the gap between the bearings. Rotating anode X-ray tubes using the latter slide bearings are disclosed in, e.g., Published Examined Japanese Patent Application No. 60-21463 and Published Unexamined Japanese Patent Application Nos. 60-97536, 60-117531, 62-287555, and 2-227948.

In each of the rotating anode X-ray tubes disclosed in the above gazettes, the bearing gap between the bearing surface facing the dynamic pressure type slide bearing, having helical grooves is about, e.g., 20 μm, and a liquid metal lubricant is applied in the helical grooves and the bearing gap. When the amount of the lubricant is excessively small, the slide bearing cannot obtain a sufficiently high dynamic pressure, as a matter of course, and the dynamic pressure type slide bearing cannot maintain a stable operation. On the other hand, when the amount of lubricant is excessively large, the lubricant tends to leak to the outside of the bearing portion. The leak occurs, when gas emission occurs from the bearing constituent member, from the lubricant during assembly or from actual operation of the X-ray tube, due to part of the lubricant being blown off to the outside from the bearing portion together with gas bubbles. When this phenomenon occurs, the stable dynamic pressure bearing operation of the slide bearing cannot be obtained, and the liquid metal lubricant scattered in the X-ray tube envelope considerably damages the breakdown voltage performance.

SUMMARY OF THE INVENTION

It is an object of the present invention to provide a rotating anode X-ray tube in which leakage of the liquid metal lubricant can be prevented and the stable bearing operation can be maintained over a long period of time, and a method of manufacturing the rotating anode X-ray tube.

According to one aspect of the invention, there is provided a rotating anode X-ray tube comprising:

a vacuum envelope;

an anode target received in the vacuum envelope;

a rotary structure to which the anode target is fixed;

a stationary structure for rotatably supporting the rotary structure, one of the rotary and stationary structures being fitted in the other of the rotary and stationary structures;

bearing sections having helical grooves and a bearing gap, and formed between the rotary and stationary structures;

a liquid metal lubricant applied to the bearing sections, gas being produced in the bearing section and the liquid metal lubricant when a heat is applied to the metal lubricant and the bearing sections during at least one of a manufacturing process of the X-ray tube and an operation of the X-ray tube; and means for relaxing a pressure of the gas produced in the bearing sections, having a gas pressure reduction space communicated with the bearing sections and formed in one of the rotary and stationary structures, the gas pressure being applied to the reduction space when the gas is produced.

According to another aspect of the invention, there is also provided a rotating anode X-ray tube comprising:

a vacuum envelope;

an anode target received in the vacuum envelope;

a rotary structure to which the anode target is fixed;

a stationary structure for rotatably supporting the rotary structure, one of the rotary and stationary structures being fitted in the other of the rotary and stationary structures and a gas pressure reduction space being formed in one of the rotary and stationary structures;

bearing sections having helical grooves and a bearing gap communicated with the pressure reduction space, and formed between the rotary and stationary structures, the other of the rotary and stationary structures having an interior space which includes the bearing gap and the pressure reduction space and has a volume; and a liquid metal lubricant applied to the bearing sections and having an amount not greater than the volume of the interior space, gas being produced in the bearing section and the liquid metal lubricant when a heat is applied to the metal lubricant and the bearing sections during at least one of a manufacturing process of the X-ray tube and an operation of the X-ray tube, the gas being applied to the reduction space to relax a pressure of the produced gas when the gas is produced.

According to yet another aspect of the invention, there is further provided a rotating anode X-ray tube comprising:

a vacuum envelope;

an anode target received in the vacuum envelope;

a rotary structure to which the anode target is fixed;

a stationary structure for rotatably supporting the rotary structure, one of the rotary and stationary structures being fitted in the other of the rotary and stationary structures and a gas pressure reduction space being formed in one of the rotary and stationary structures;

bearing sections having helical grooves and bearing gap communicated with the reduction space, and formed between the rotary and stationary structures, the other of the rotary and stationary structures having an interior space which includes the bearing gaps and the reduction space and has a volume measured from one of the outermost groove to another one of the outermost groove; and a liquid metal lubricant applied to the bearing sections and having an amount not greater than 70% the volume of the interior space.

According to further aspect of the invention, there is furthermore provided a rotating anode X-ray tube comprising:

a vacuum envelope;

an anode target received in the vacuum envelope;

a rotary structure to which the anode target is fixed;

a stationary structure for rotatably supporting the rotary structure, a gas pressure reduction space being formed in the one of the rotary and stationary structures, a lubricant chamber and a radial channel communicating with the lubricant chamber being formed in the one of the rotary and stationary structures, the other of the rotary and stationary structure having an opening for receiving the one of the rotary and stationary structures and the one of the rotary and stationary structures being inserted in the other of the rotary and stationary structures through the opening;

bearing sections having helical grooves and bearing gap communicated with the lubricant chamber through the lubricant channel, and formed between the rotary and stationary structures; and a liquid metal lubricant applied to the bearing sections and having an amount in a range not closing the at least one radial channel when the X-ray tube is set such that the opening of the other of the rotary and stationary structures faces upward and the rotating axis of the rotary structure is substantially vertical.

According to a further aspect of the invention, there is yet further provided a method of manufacturing a rotating anode X-ray tube, the rotating anode X-ray tube comprising:

a vacuum envelope;

an anode target received in the vacuum envelope;

a rotary structure to which the anode target is fixed;

a stationary structure for rotatably supporting the rotary structure, one of the rotary and stationary structures being fitted in the other of the rotary and stationary structures and a gas pressure reduction space being formed in one of the rotary and stationary structures;

radial and thrust bearing sections having helical grooves and bearing gap communicated with the recessed space, and formed between the rotary and stationary structures, the other of the rotary and stationary structures having an interior space which includes the bearing gaps and the reduction space and has a volume measured from one of the outermost groove to another one of the outermost groove; and a liquid metal lubricant applied to the bearing sections; comprising steps of:

applying a predetermined amount of the liquid metal lubricant in the other of the rotary and stationary structures, the predetermined amount of the liquid metal lubricant being sufficient for filling the bearing sections and not greater than the 70% volume of the interior space; and evacuating the vacuum envelope in which the stationary and rotary structures are located, while at least part of the bearings to which no lubricant is filled is communicated with the vacuum envelope and the rotary structure is not rotated.

According to the rotating anode X-ray tube of the present invention, even if gas emission from the bearing constituent members and the liquid metal lubricant occurs, gas bubbles can be reliably and easily discharged from the bearing portions, so that lubricant leakage can be prevented, thereby maintaining a stable bearing operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a longitudinal sectional view showing a rotating anode X-ray tube according to an embodiment of the present invention;

FIG. 6 is a longitudinal sectional view, similar to FIG. 5, showing the rotating anode X-ray tube of FIG. 1 during assembly;

FIGS. 11 and 12 are longitudinal sectional views showing the assembled state and the state of use, respectively, of the rotating anode X-ray tube shown in FIG. 1;

FIG. 15 is a longitudinal sectional view of a rotating anode X-ray tube according to still another embodiment of the present invention;

FIG. 16 is a longitudinal sectional view of a rotating anode X-ray tube according to still another embodiment of the present invention;

FIG. 17 is a longitudinal sectional view of a rotating anode X-ray tube according to still another embodiment of the present invention.

DETAILED DESCRIPTION OF THE PREFERRED EMBODIMENTS

Figure 2:
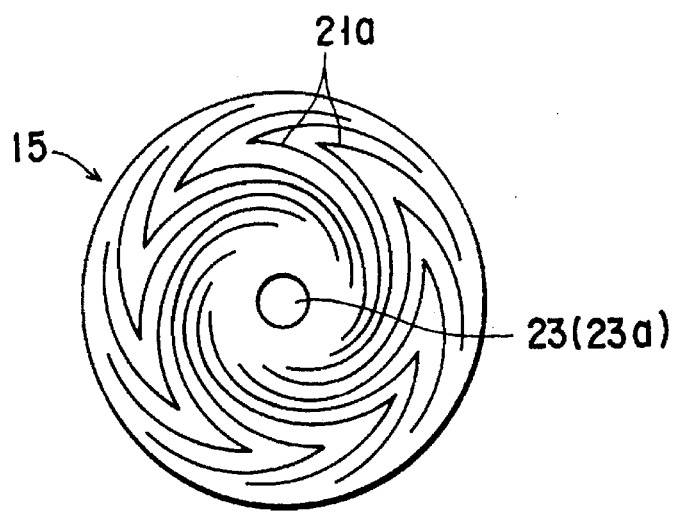
FIG. 2 is a plan view showing the upper surface of a stationary member shown in FIG. 1.

The preferred embodiments of the rotating anode X-ray tube according to the present invention will be described with reference to the accompanying drawings. Note that the same reference numerals denote the same portions throughout the drawings.

The rotating anode X-ray tube according to the embodiment shown in FIGS. 1 to 12 has the following structure. That is, in a completed X-ray tube after assembly, a disk-like anode target 11 made of a heavy metal is integrally fixed to a rotating shaft 13 extending from one end of a bottomed cylindrical rotary structure 12 by a nut 14. A double rotor cylinder consisting of a ferromagnetic cylinder 12a and a high-conductive cylinder 12b is coaxially fixed to the outer circumferential surface of the rotary structure 12 by fitting. A columnar stationary structure 15 is inserted in the rotary structure 12. A small-diameter portion 15a of the stationary structure having a reduced outer diameter is formed on the lower end portion (in FIG. 1) of the stationary structure 15, i.e., near an opening section 12c of the rotary structure. An annular opening closing member 16 for closely surrounding the small-diameter portion 15a to substantially close the opening section 12c is fixed to the opening section 12c of the rotary structure by a plurality of bolts 16a. An iron anode support 17 for mechanically supporting the rotary and stationary structures 12 and 15 is fixed to the small-diameter portion 15a by brazing. The anode support 17 is hermetically bonded to a glass vacuum envelope 18.

Figure 3:
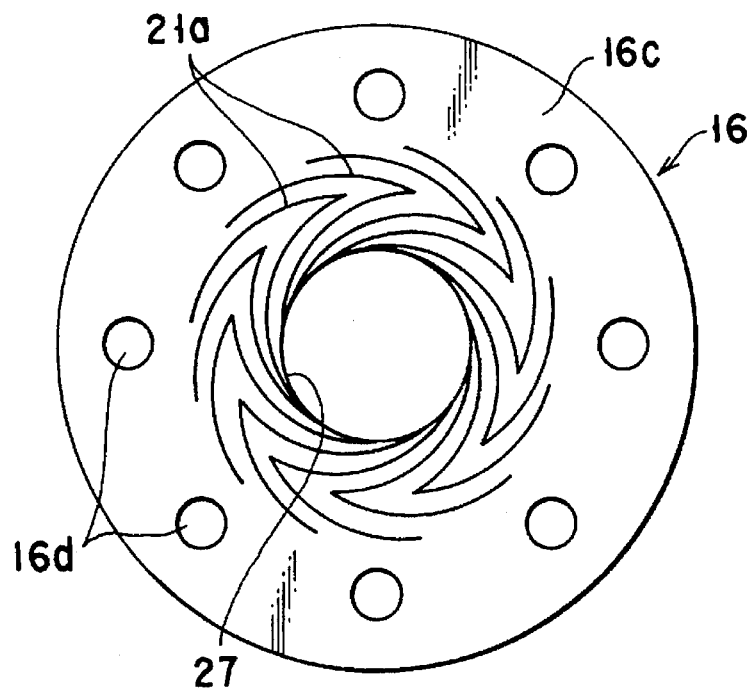
FIG. 3 is a plan view showing the upper surface of an opening closing member shown in FIG. 1.

Dynamic pressure type helical groove bearing portions, as indicated in the gazettes cited above, are formed in the fitting portions between the cylindrical rotary structure 12 and the stationary structure 15. More specifically, herringbone helical grooves 19a and 19b are formed in the outer circumferential wall of the stationary structure 15 at predetermined intervals in the axial direction to constitute two radial slide bearing portions 20a and 20b. Circular herringbone helical grooves 21a as shown in FIG. 2 are formed in the upper end face (in FIG. 1) of the stationary member 15 to constitute one thrust slide bearing portion 22a. Similarly, circular herringbone helical grooves 21b as shown in FIG. 3 are formed in an upper face 16c of the closing member 16 to constitute the other thrust slide bearing portion 22b. The bearing surfaces of the rotary and stationary structures 12 and 15 oppose each other at a bearing gap G of about 20 μm.

A lubricant chamber 23 is formed in the stationary structure 15. The lubricant chamber 23 is constituted by a hole formed by boring the central portion of the stationary structure 15 in the axial direction between the thrust bearing portions 22a and 22b. An opening 23a, at the upper end (in FIG. 1) of the lubricant chamber 23, is located at the inner central portion of the end face of the stationary structure 15 and communicates with the bearing gap G of the thrust bearing portion 22a. The outer circumferential region of the stationary structure 15 between the two radial slide bearing portions 20a and 20b is recessed to form a small-diameter portion 24, and. Four radial channels 25 are symmetrically formed in the small-diameter portion 24 at angular intervals of 90° to communicate from the lubricant chamber 23 to a recessed space S1 defined by the small-diameter portion 24. Hence, the lubricant chamber 23 communicates with the circumferential recessed space S1 through the radial channels 25 formed in the axially intermediate portion of the lubricant chamber 23, and then communicates with the bearing gap G of each of the upper and lower (in FIG. 1) radial bearing portions 20a and 20b. A lower end portion 23b (in FIG. 1) of the lubricant chamber 23 extends downward to the vicinity of the lower thrust helical groove slide bearing portion 22b and is terminated. A circumferential space 26 is formed between the opening closing member 16 and the small-diameter portion 15a. A small gap Q is formed between a cylindrical portion 16b of the closing member 16 and the inner small-diameter portion 15a of the stationary member 15 and a screw pump groove 27 is formed in an inner surface of the cylindrical portion 16b in the small gap Q. The screw pump groove 27 and the small gap Q constitute a lubricant leakage suppressing means. The circular space 26 has a radial gap sufficiently larger than the small gap Q.

A liquid metal lubricant L, e.g., a Ga alloy, is applied in an interior space, i.e., in the helical grooves of the bearing portions 20a, 20b, 22a, and 22b, the bearing gap G, the lubricant chamber 23, the radial channels 25, and the space S1 defined by the small-diameter portion 24, which latter three communicate with the helical grooves and the bearing gap. The amount of the liquid metal lubricant L is a volume of about 50% the capacity of the interior space to which the liquid metal lubricant can be received and includes the inner helical grooves 20a, 20b, 22a, and 22b, the bearing gap G, the lubricant chamber 23, the radial channels 25, and the space S1 defined by the small-diameter portion 24. More specifically, in this embodiment wherein the radial channels 25 are located in the intermediate portion in the axial direction of the lubricant chamber 23, the spaces of the respective portions of the upper and lower portions are symmetric, and thus the upper and lower space capacities are substantially equal to each other, the amount of the liquid metal lubricant L is of a volume corresponding to a range V extending from the lower thrust bearing portion 22b to the intermediate portion of the radial channels 25 when the liquid metal lubricant L is entirely located in the lower portion, as shown in FIG. 1. In FIG. 1, character H denotes a maximum level of the liquid metal lubricant received in the interior space, when the liquid metal lubricant L having the amount which is the volume of about 50% the capacity of the interior space and the X-ray tube is vertically set, as shown in FIG. 1. Accordingly, when the X-ray tube of FIG. 1 is vertically set upside down such that the small gap Q is located on the upper side, the liquid metal lubricant L almost fills lower half of the radial channels 25, and the lubricant chamber 23 and the upper half of the radial channels 25 communicate with the interior of the vacuum envelope 18 through one radial bearing portion 20b, the bearing gap G of the thrust bearing portion 22b, and the small gap Q.

Figure 4:
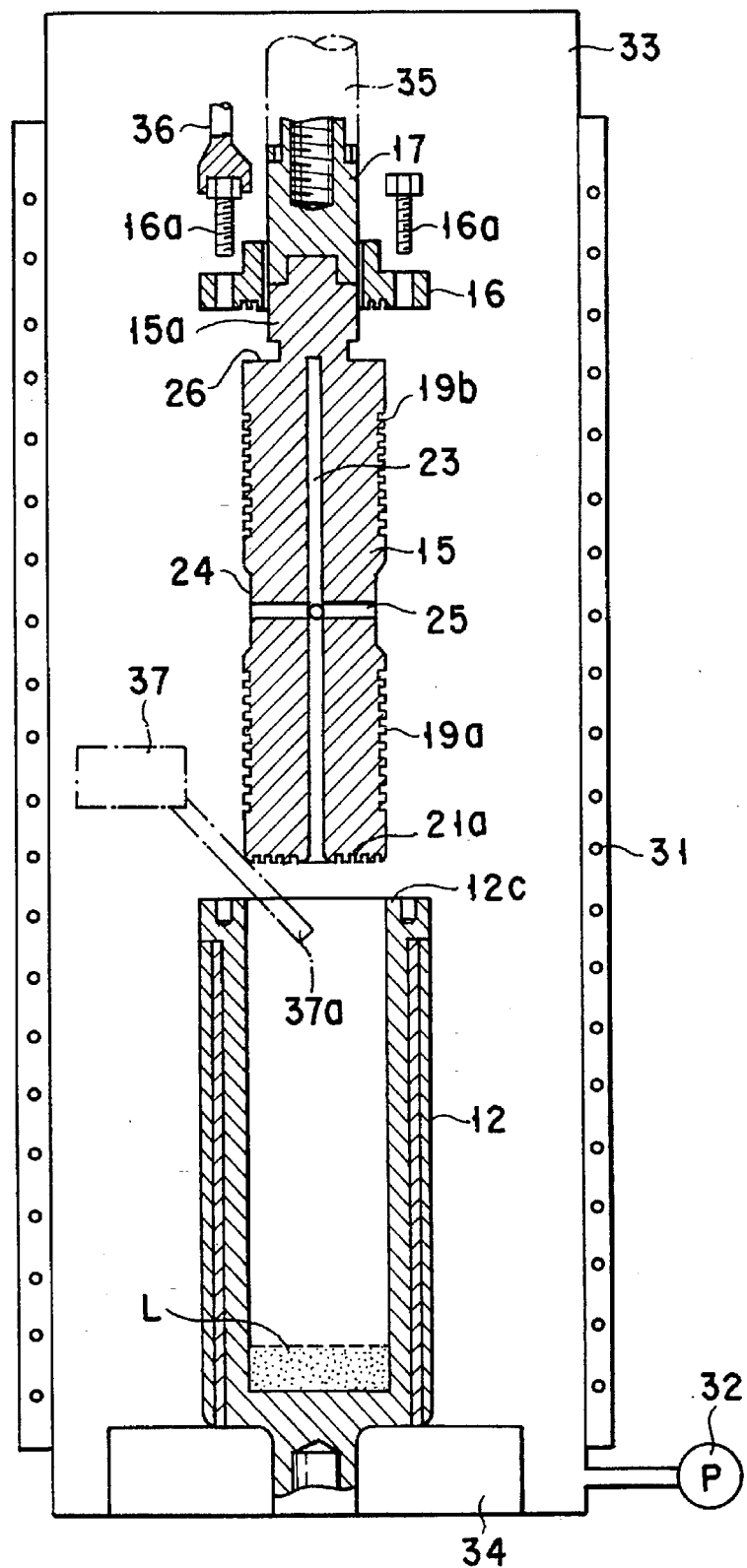
FIG. 4 is a longitudinal sectional view showing the rotating anode x-ray tube of FIG. 1 during assembly.

When the liquid metal lubricant L is to be applied, respective bearing constituent members are arranged in a vacuum bell-jar 33 having a heater 31 and connected to an exhaust pump 32 as shown in FIG. 4. The rotary structure 12 is placed on an ultrasonic vibrator 34 serving also as a holder such that its opening section 12c faces upward. A stationary structure holder 35 for suspending and holding the stationary structure 15 above the rotary structure 12 is provided in the vacuum bell-jar 33. The holder 35 suspends the stationary structure 15 by positioning it above the rotary structure 12. The closing member 16 is held on the upper outer circumferential portion of the stationary structure 15 by a holder (not shown), and the plurality of bolts 16a for fixing the closing member 16 are positioned and held at predetermined positions by clamps 36. A lubricant injector 37, incorporating a liquid metal lubricant, e.g., a Ga alloy, is provided in the vacuum bell-jar 33, and a distal end 37a of the injection nozzle is inserted into a space in the opening section 12c by a control unit (not shown) arranged outside the vacuum bell-jar 33, as shown in FIG. 4, so that a predetermined amount of the lubricant L can be injected into the rotary structure 12. Although not shown, a temperature detector for detecting the temperatures of the bearing constituent members 12, 15, . . . is provided.

The respective components and the control unit are arranged as shown in FIG. 4, and the interior of the bell-jar 33 is evacuated by the exhaust pump 32 to, e.g., about $10^{-3}$ Pa or less. At least the respective bearing members are heated by the heater 31 to 200° C. or more, e.g., about 450° C., and are maintained at this temperature for a predetermined period of time. Then, the gas is emitted from the respective components and the liquid metal lubricant L and is exhausted by the exhaust pump 32. The respective bearing members are cleaned by this vacuum heating.

The distal end of the lubricant injection nozzle 37a is inserted into the space of the opening section 12c, as shown in FIG. 4, and the liquid metal lubricant L, which is measured in the manner as described above, is injected into the rotary structure 12. Referring to FIG. 4, reference symbol L denotes the injected liquid metal lubricant. The gas emitted from the liquid metal lubricant L and the inner surface of the rotary structure 12 contacting it is effectively discharged into the bell-jar 33 and exhausted by ultrasonic vibration.

Figure 5:
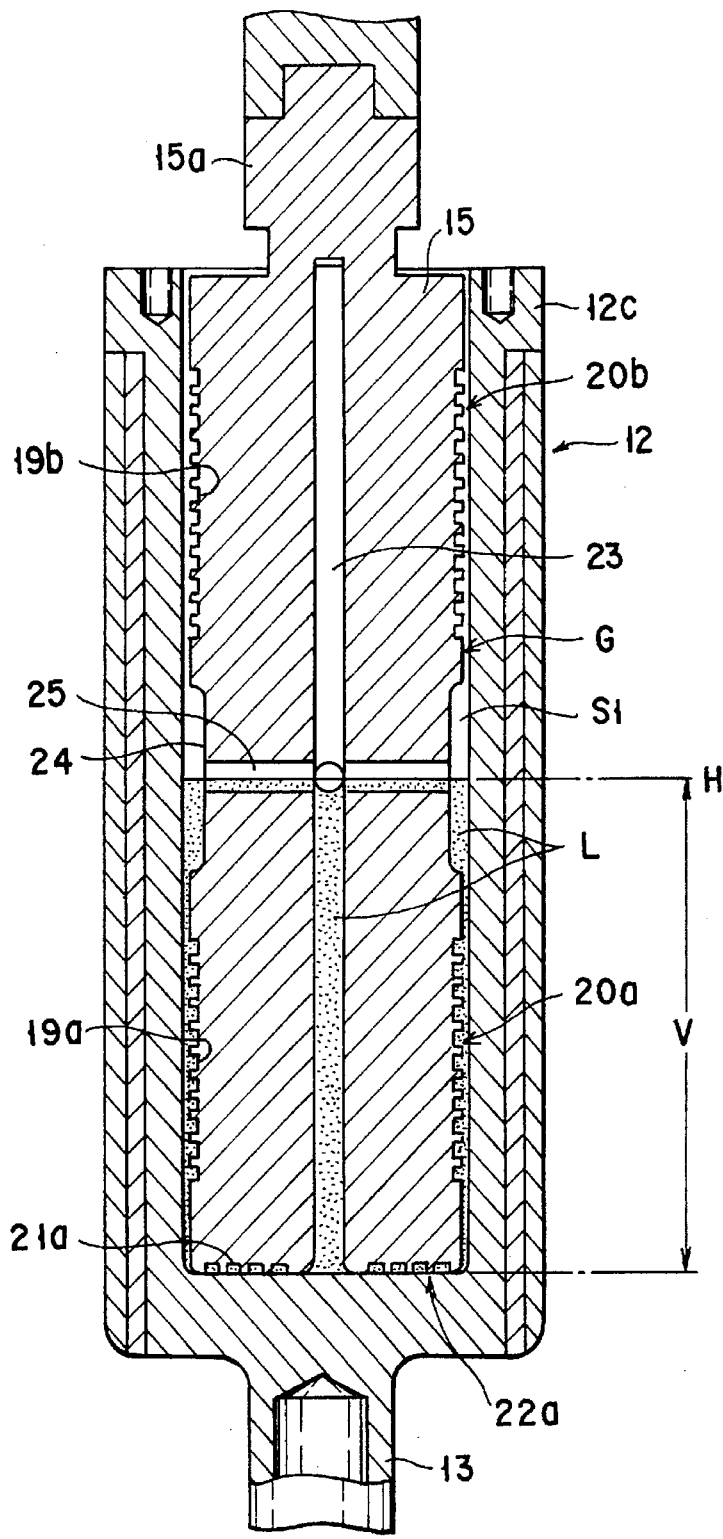
FIG. 5 is an enlarged longitudinal sectional view similarly showing the rotating anode X-ray tube of FIG. 1 during assembly.

Then, the control unit controls the lubricant injector 37 to move into the initial position, and the stationary structure 15 is slowly moved downward to be inserted in the rotary structure 12, as shown in FIG. 5. Thus, the liquid metal lubricant L, present on the bottom portion of the rotary structure 12, flows into the lubricant chamber 23 at the central portion of the stationary structure 15 through the bearing gap G between the rotary structure 12 and the stationary structure 15, the helical grooves 19a, 19b, 21a, and 21b, and the radial channels 25, and is elevated from the thrust bearing portion 22a in the lower portion of FIG. 5 up to the radial channels 25 located in the axially intermediate portion of the stationary structure 15 to cover the range V. The bearing surfaces in this range V are wetted with the lubricant L. In this state, the stationary structure 15 may be vertically moved by the piston operation with or without slow rotation. Then, the lubricant L wets also the bearing surface in the upper portion in FIG. 5 and is substantially held by the bearing portions 20a, 20b, 22a, and 22b. At this time, when the gas is emitted from the respective portions to form bubbles, the bubbles are moved upward to be discharged to the outside of the bearing members and are exhausted by the pump 32. Then, the lubricant L substitutes the bubbles to permeate in the respective portions. Ultrasonic vibration promotes gas discharge and substitution between the gas bubbles and the lubricant. When the rotary and stationary structures 12 and 15 are fitted in this manner, the closing member 16 is fitted on the opening section 12c and fixed by clamping the plurality of bolts 16a by the clamps 36, as shown in FIG. 6. In this state, the lubricant L is located up to about half the radial channels 25, and the lubricant chamber 23 and the upper half of the radial channels 25 communicate with the interior of the vacuum container 18 through one radial bearing portion 20b, the bearing gap G of the thrust bearing portion 22b, and the gap Q. When heating in vacuum and ultrasonic vibration are continued in this state, the gas from the bearing portions and the lubricant L can be discharged more completely through these gaps. Then, vacuum heating is performed for a predetermined period of time, and the anode assembly tube is gradually cooled to room temperature of about 25° C. in vacuum. Thereafter, the anode target 11 is fixed to the rotating shaft 13 with the nut 14. Subsequently, the anode support 17 is fitted on the metal ring on the end portion of the vacuum envelope 18 and hermetically welded. The anode assembly is incorporated in the glass vacuum envelope 18 serving as the X-ray bulb in this manner, and evacuation of the X-ray bulb is started.

Figure 7:
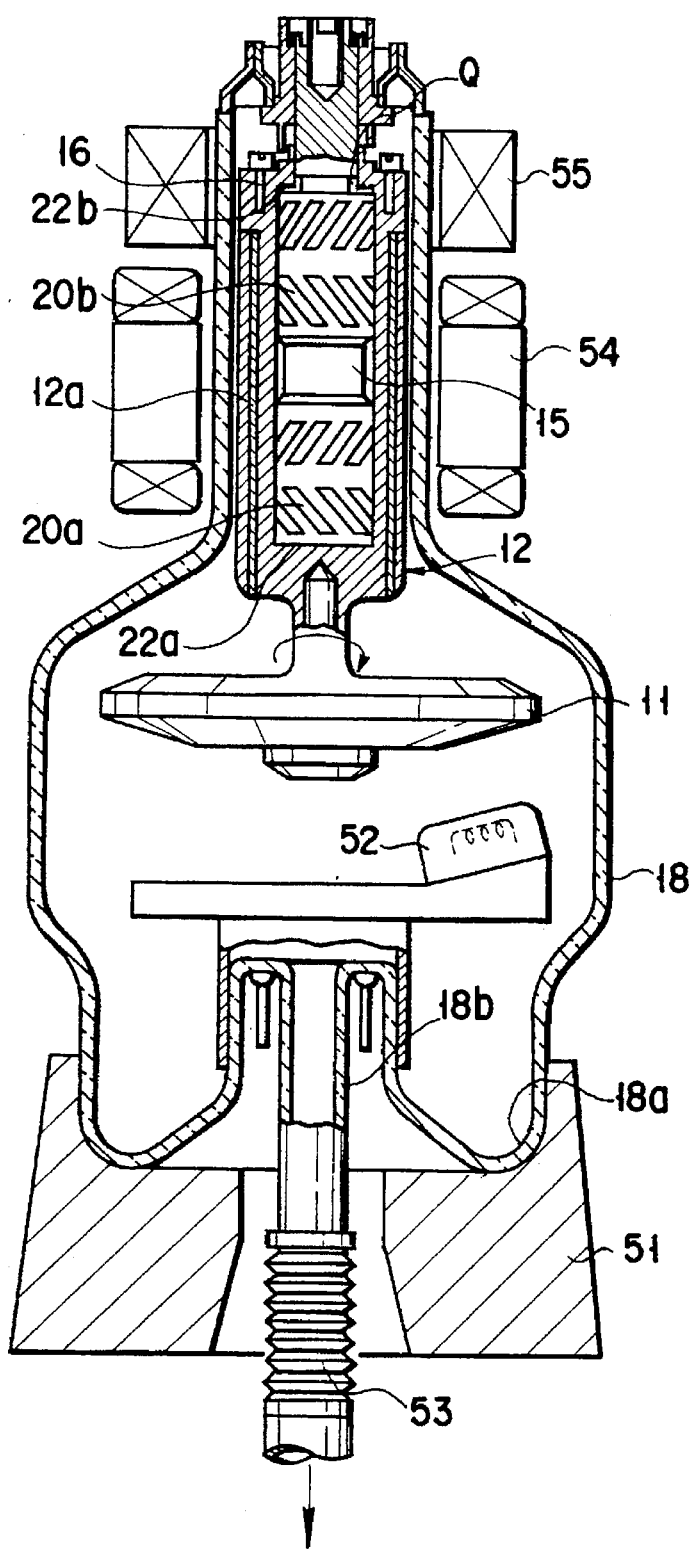
FIG. 7 is a longitudinal sectional view showing the rotating anode X-ray tube shown in FIG. 1 during assembly.

In the evacuation, as shown in FIG. 7, an end portion 18a of the vacuum container 18 near a cathode assembly 52 is placed on a holder 51 in a heating furnace (not shown) such that the opening Q between the rotary and stationary structures faces upward. An exhaust pipe 18b, joined to the vacuum container, is connected to the vacuum pump (not shown) through a vacuum bellows 53. A stator 54 for rotating the rotary structure and an electromagnet 55 are arranged around the vacuum container corresponding to the rotary member 12 which is held to face upward, such that the electromagnet 55 is located above the stator 54. The electromagnet 55 is located such that its center in the axial direction is shifted above the upper end of the ferromagnetic cylinder 12a of the rotary member 12. Thus, when a DC current is supplied to the electromagnet 55, the rotary structure 12 is lifted upward by the magnetic attraction of the electromagnet 55. A permanent magnet may be movably provided in place of the electromagnet.

The interior of the vacuum container of the X-ray tube is evacuated to a vacuum by an evacuating unit having the arrangement as described above. The temperature in the heating furnace is increased, and the respective portions of the X-ray tube are heated by an RF induction heating unit (not shown) to emit gas, thus evacuating the X-ray tube. At an appropriate timing during the evacuation, the DC current is supplied to the electromagnet 55 to lift the rotary member 12 upward as indicated by an arrow F in FIG. 8. Hence, the rotary structure 12 that has been suspended by its own weight and the bearing surface of the upper bearing portion 22b of the stationary structure 15 in FIG. 8, that has been in tight contact with the rotary structure 12, are separated from each other, and the bearing gap G is increased. In addition, since a maximum line H of the lubricant L is located at the intermediate portion of the radial channels 25, a portion of the lubricant housing 23 above the waterline H, the radial channels 25, and the radial bearing gap G (20a) communicate with the space in the vacuum container through the increased thrust bearing gap G and the opening Q with a relatively large air-passage conductance. The gas emitted from the bearing constituent members and the liquid metal lubricant L is effectively discharged through these passages and exhausted by the vacuum pump. Furthermore, only the gas can be discharged without accompanying leakage of the lubricant. This state is maintained for an appropriate period of time, and the current to the electromagnet 55 is stopped.

Figure 9:
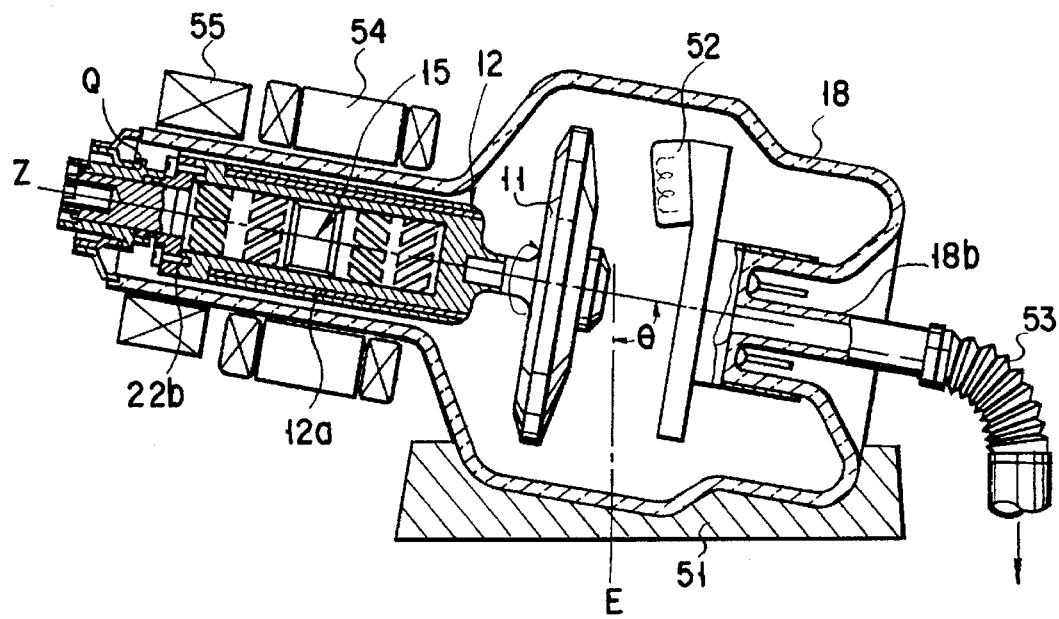
FIG. 9 is a longitudinal sectional view showing the rotating anode X-ray tube shown in FIG. 1 during assembly.
Figure 10:
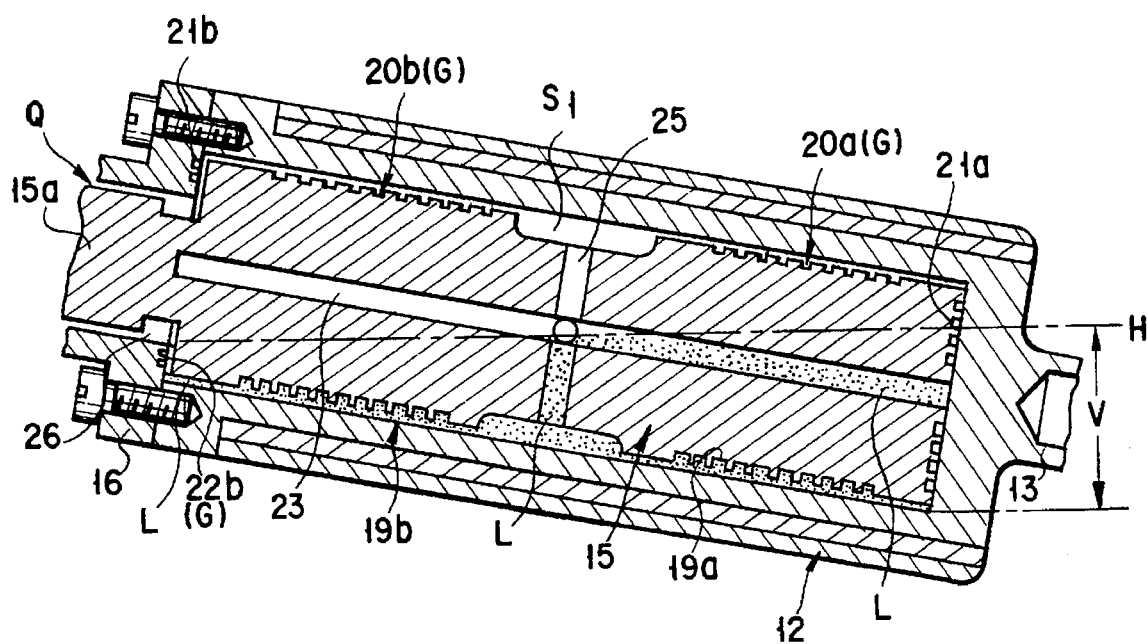
FIG. 10 is an enlarged longitudinal sectional view showing rotary and stationary structures shown in FIG. 9.

As shown in FIG. 9, the X-ray tube is sideways such that its tube axis Z forms an angle θ near 90° C., e.g., 80° with respect to a vertical line E. Then, as shown in FIG. 10, the liquid metal lubricant L flows to the bearing gaps of the radial bearing portion 20b and thrust bearing portion 22b in the left portion of FIG. 10 to wet their bearing surfaces. The maximum level H of the lubricant L reaches part of the thrust bearing portion 22b. While evacuation is performed in this state, an AC current is supplied to the stator 54 to gradually rotate the rotary member 12 by a rotating magnetic field. Then, the lubricant L fills all the bearing gaps to wet their bearing surfaces. When the rotational speed is gradually increased, a stable lubricating performance can be obtained without causing excessive friction between the bearing surfaces. In this manner, while the anode target 11 is continuously rotated at about 3,000 rpm, the electron beam is emitted from the cathode assembly 52 to bombard the target, or the target is heated to, e.g., 450° C. by RF induction heating, and the gas is emitted from the respective components and discharged.

In this process, rotation of the rotator by the stator 54 is stopped, and the current is supplied to the electromagnet 55 to move the rotary member 12 to the left in FIG. 10. Then, the lubricant L gathers to the lower portion again by its own weight, and the maximum line H is restored to almost the initial position. Strictly speaking, since part of the lubricant thinly attaches to the respective bearing surfaces and is collected in the helical grooves, the maximum line H is located at a position slightly lower than the initial position. In this state, part of the radial bearing gap G and part of the thrust bearing gap G form gas passages not containing the lubricant. Therefore, the gas emitted from the bearing constituent members and the lubricant can be efficiently discharged through the bearing gaps of the radial bearing portions, the bearing gap G of the enlarged thrust bearing portion, the circumferential space 26, and the opening Q. In addition, only the gas can be discharged without accompanying leakage of the lubricant. The above-described operations may be repeatedly performed in an appropriate combination an appropriate number of times. In the final step of this evacuation, the exhaust pipe 18b is sealed and aged in an appropriate manner, thus completing the X-ray tube.

The falling angle θ in the evacuation may be 90° or slightly larger than that. It suffices, that least part of the opening Q, communicating from the slide bearing portions to the space in the vacuum envelope, is located above the waterline H of the liquid metal lubricant L while the rotary structure is not rotated. Evacuation may be performed with the X-ray tube sideways from the beginning. In this case, even if the rotary structure is not moved by a magnet, part of the thrust bearing gaps is likely to form a gas passage. Hence, no magnet need be arranged.

Figure 8:
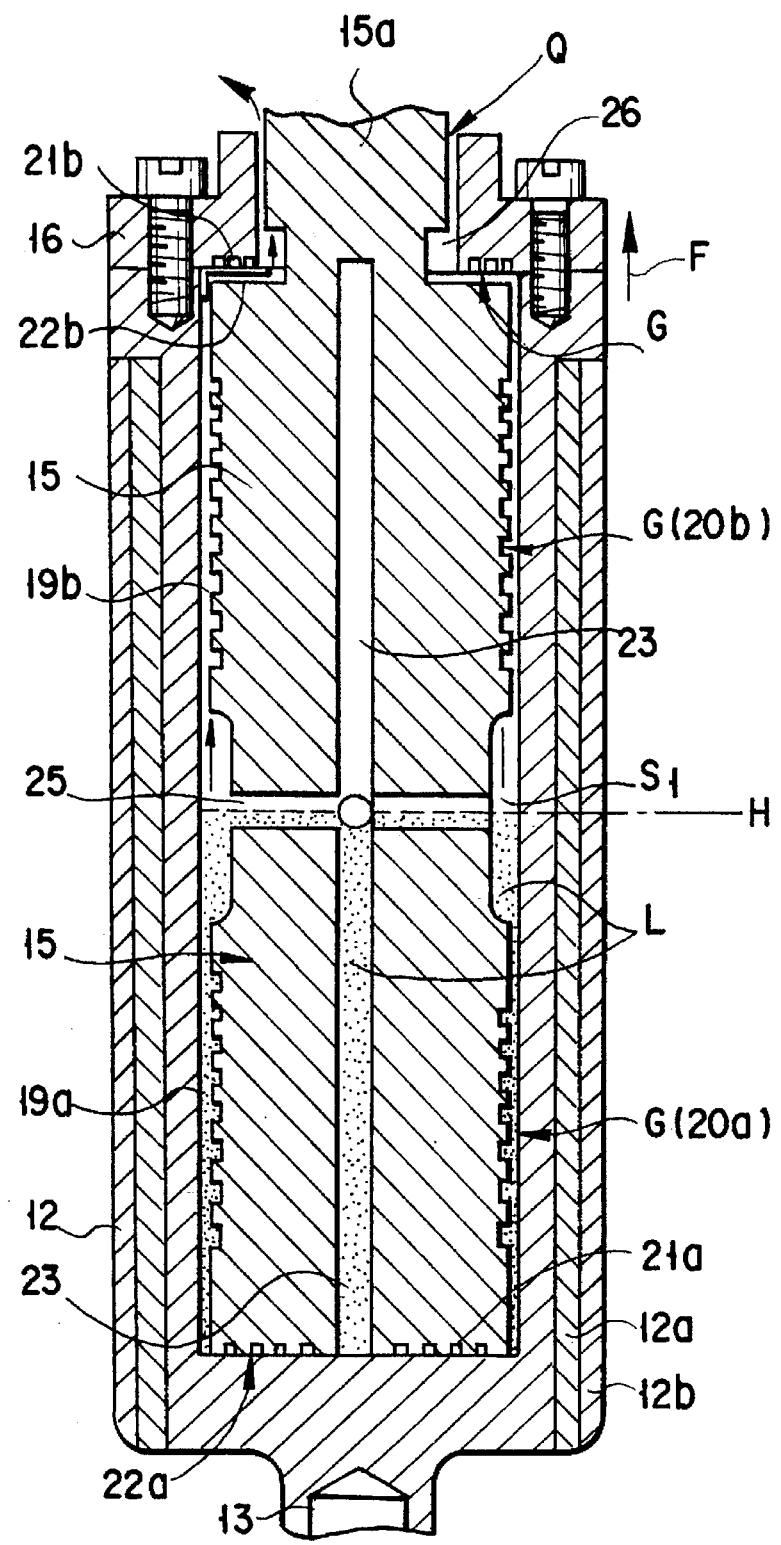
FIG. 8 is an enlarged longitudinal sectional view showing rotary and stationary structures shown in FIG. 7.

In the bearing structure assembled in this manner, the metal liquid lubricant L is applied in the bearing gap G including the helical grooves 19a, 19b, 21a, and 21b, the lubricant chamber 23, and the like, and the bearing surfaces are wetted well with the lubricant L. Since the amount of the lubricant L is about half the capacity of the interior space in which the lubricant L can flow or move, measured from the thrust bearing portion 22b closest to the small gap Q to the thrust bearing portion 22a, when the rotating shaft 13 is stopped in the horizontal position, as shown in FIG. 11, the lubricant L is located within a range V which includes the bearing surfaces in the lower portion of FIG. 11 and substantially the central portion of the lubricant chamber 23 on the central axis. Since some lubricant L remains in the upper helical grooves and bearing gaps, the actual retention, range V of the lubricant L is slightly decreased. Even if the gas is emitted from the bearing portions 20a, 20b, 22a, and 22b and a gas pressure is applied to the liquid metal lubricant the gas pressure is applied to the upper space of the lubricant chamber 23, the upper portions of the channels the upper bearing gap which has a small amount of the lubricant L to easily form the channel, and the helical grooves so that the gas pressure is reduced and the gas bubbles is guided through them in the manner as indicated by arrows in FIG. 11, and are discharged to the outside through the gap Q. However, the liquid metal lubricant does not leak from the bearing portion 22a to the outside of the gap Q, since the gap Q is sufficiently small and the liquid metal lubricant hardly enters the gap Q due to a surface tension of the metal lubricant. Thus, the lubricant L will hardly be substantially squeezed to the outside of the bearings, and only the gas bubbles are discharged. Similarly, even when the rotating shaft 13 is stopped such that the closing member 16 is upwardly inclined, as shown in FIG. 8, the lubricant L is retained in a range V occupying almost half the lubricant chamber 23 and radial channels 25. Therefore, the emitted gas is easily discharged from the bearing portions in the same manner as described above, and the lubricant L will hardly be substantially squeezed to the outside of the bearing portions. In this manner, even if gas emission should occur from the bearing portions, the gas pressure is reduced in the spaces and the gas bubbles are reliably and easily discharged through the helical gaps and the bearing gaps that are not closed with the lubricant L. Therefore, leakage of the lubricant L to the outside of the bearing portions is prevented, and a rotating anode assembly having a stable dynamic pressure type slide bearing operation can be obtained.

In the operation of this rotating anode X-ray tube, a stator (not shown), i.e., an electromagnetic coil is disposed at a position to oppose the rotary structure 12 outside the vacuum envelope 18 in order to generate a rotating magnetic field, and the rotating anode is rotated at a high speed as indicated by an arrow p in FIG. 1. The liquid metal lubricant L sufficiently applies the helical slide bearing portions 20a and 20b to enable a smooth bearing operation. The liquid metal lubricant L is moved and circulated in the lubricant chamber 23 in the central portion of the stationary structure 15, the radial channels 25, and the bearing gap G having the helical grooves 19a, 19b, 21a, and 21b to reach the bearing portions 20a, 20b, 22a, and 22b, and is used for the stable bearing operation. The electron beam emitted from a cathode (not shown) bombards the anode target 11 to irradiate X-rays. Heat generated in the target 11 is mostly dispersed by radiation and is partly transmitted from the rotary structure 12 to the liquid metal lubricant L in the bearing portions and is dispersed to the outside through the stationary structure 15.

Figure 13:
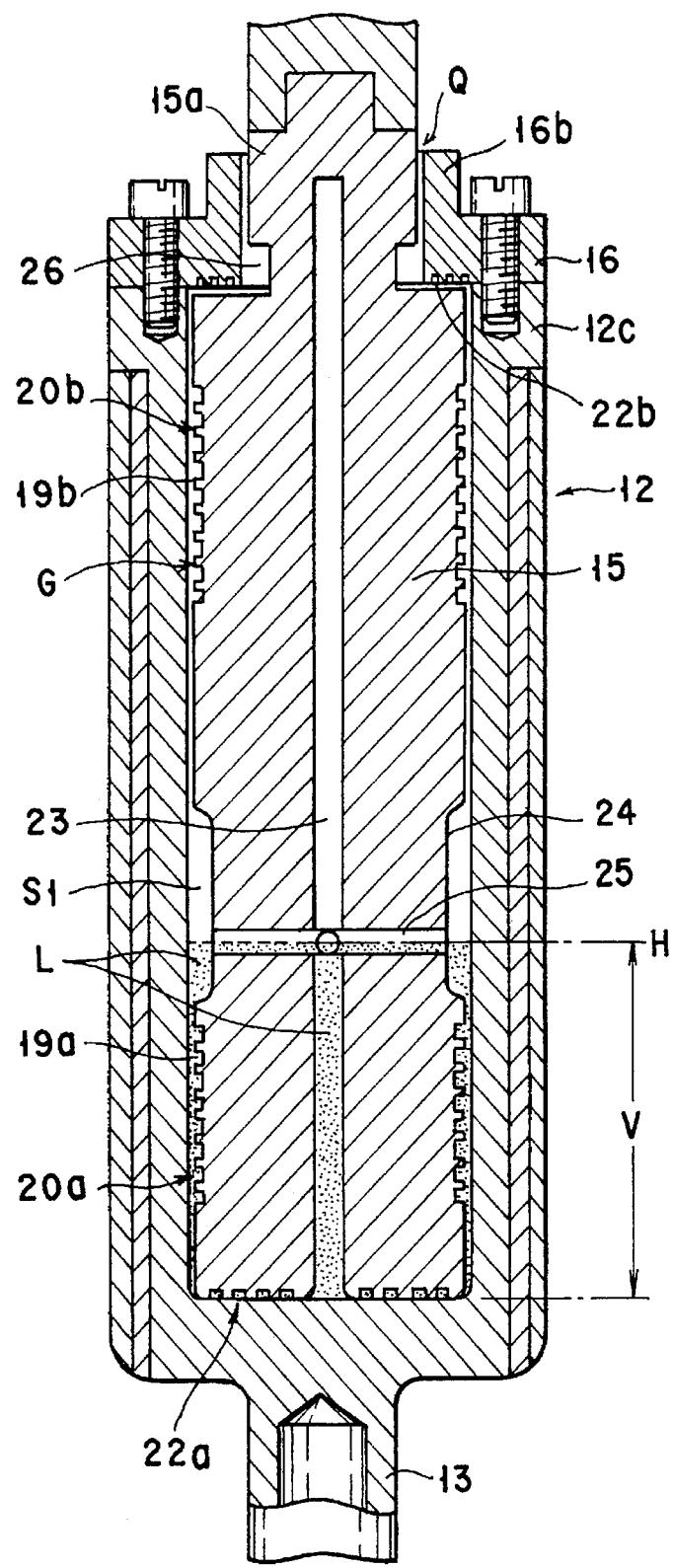
FIG. 13 is a longitudinal sectional view of a rotating anode X-ray tube according to another embodiment of the present invention.

In another embodiment shown in FIG. 13, when an gap Q is set to face upward, radial channels 25 located between two radial slide bearing portions 20a and 20b are formed at a position about ⅓ the axial length of a lubricant chamber 23 on the central axis from its lower end, and a lubricant L is applied in an amount corresponding to a range V covering from a thrust bearing portion 22a to the intermediate position of the radial channels 25. The amount of the lubricant L is of a volume corresponding to about 30% the capacity of the interior space, in which the lubricant can flow or move, measured from the thrust bearing portion 22a closest to the gap Q to thrust bearing portion 22b. Then, the radial channels 25 and about upper ⅔ the lubricant chamber 23 are not filled with the lubricant L, and pressure reduction and discharge channel of the gas emitted from the bearing portions are reliably assured. As a result, a rotating anode X-ray tube that is substantially free from lubricant leakage can be obtained.

Figure 14:
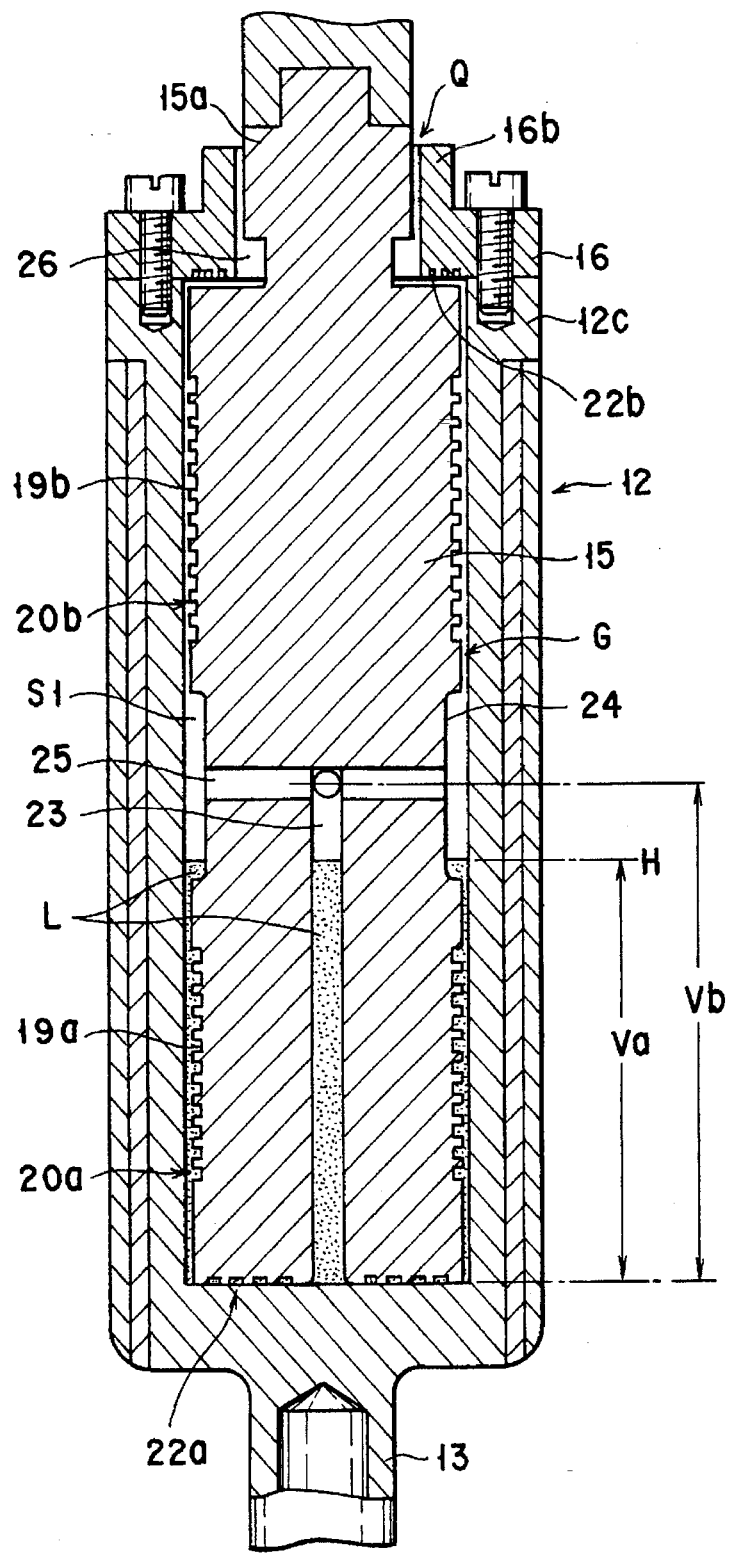
FIG. 14 is a longitudinal sectional view of a rotating anode X-ray tube according to still another embodiment of the present invention.

In still another embodiment shown in FIG. 14, a lubricant chamber 23 on the central axis of the X-ray tube is formed on only one side of intermediate radial channels 25, and a lubricant L is applied in a range va not reaching the radial channels 25 when the X-ray tube is set such that its gap Q faces upward. The amount of the lubricant L is of a volume corresponding to about 50% the capacity of the interior space in which the lubricant can flow or move, measured from a thrust bearing portion 22b to the thrust bearing portion 22a. The radial channels 25 are not closed with the lubricant L at all but are open, so that the gas can be reliably and easily discharged to the outside.

Furthermore, in a structure similar to that of FIG. 14, a lubricant L may be applied in an amount corresponding to a range Vb from a thrust bearing portion 22a to almost the intermediate portion of radial channels 25. In this case, the amount of the lubricant L is of a volume corresponding to about 70% the capacity of the interior space in which lubricant can flow or move, measured from the thrust bearing portion 22b to the thrust bearing portion 22a. Then, a rotating anode X-ray tube substantially free from lubricant leakage can be obtained.

In still another embodiment shown in FIG. 15, no lubricant chamber or radial channels are formed in the stationary structure. Also in this case, the amount of the lubricant is of a volume corresponding to about 40% the total interior capacity of the helical grooves, the bearing gaps, and a circumferential space S1 of the intermediate small-diameter portion, in which the lubricant can flow or move.

In the embodiments described above, the anode target is fixed to the cylindrical rotary structure. However, the present invention is not limited to them, but can similarly be applied to an arrangement as shown in FIG. 16, wherein a columnar rotary structure 12 on which an anode target is integrally coupled and rotated is arranged on the rotation central axis. More specifically, a rotating shaft 13 constituted by a pipe is fixed to the upper portion of the columnar rotary structure 12, and an anode target 11 is fixed to the rotating shaft 13. A bottomed cylindrical stationary structure 15 is provided to surround the rotary structure 12. A closing member 16 is fixed to an end opening section 15b on the upper end of the stationary structure 15 with a plurality of bolts 16a by clamping. A ferromagnetic cylinder 41 serving as the rotor cylinder of the motor and a copper outermost cylinder 42 fitted on the ferromagnetic cylinder 41 are coaxially arranged to surround the stationary structure 15. An upper end portion 41a of the ferromagnetic cylinder 41 is mechanically firmly fixed to the rotating shaft 13. The closing member 16 contacts the upper end face of the rotary structure 12, and helical grooves 21 are formed in the contact surface of the closing member 16. A circumferential space 26 is formed in the lower half of the inner circumferential surface of the closing member 16 close to the rotating shaft and in the circumferential surface of the rotating shaft of the rotary structure 12. The space 26 communicates with the inner end of a bearing gap G of a thrust bearing portion 22b. A gap Q and a radial bent portion 43 for preventing leakage of the lubricant L are formed midway along the path extending from the space 26 to the interior of the vacuum envelope through the gap between the outer circumferential surface of the stationary member 15 and the inner circumferential surface of the ferromagnetic cylinder 41. The liquid metal lubricant L has a volume corresponding to about 50% the capacity of the interior space in which the lubricant can flow or move, measured from the thrust bearing portion 22b to the thrust bearing portion 22a. When the gap Q is set to face upward, radial channels 25 located between two radial bearing portions 20a and 20b are not closed with the lubricant L. Thus, the radial channels 25 and part of a lubricant chamber 23 serve as the pressure-reduction and discharge paths of the gas emitted from the bearing portions, so that a rotating anode X-ray tube having a bearing structure free from lubricant leakage can be obtained.

In still another embodiment shown in FIG. 17, a large-diameter portion 15c is formed at a position of a stationary structure 15 close to an anode target 11, and two thrust bearing portions 22a and 22b having circular herringbone helical grooves 21a and 21b are formed at two end faces thereof. Two radial bearing portions 20a and 20b are formed close to a gap Q with helical grooves 19a and 19b formed in the stationary structure 15 extending downward from the large-diameter portion 15c in FIG. 17. An opening 23a of a lubricant chamber 23, formed in the stationary structure 15, is open to a space S2 defined by the end face of the stationary structure 15 and the bottom surface of a rotating structure 12. One radial channel 25 is open to a space S3 formed around the outer circumferential surface of the large-diameter portion 15c and communicates with a bearing gap G of the thrust bearings and the helical grooves through the space S3 between the outer circumferential surface of the large-diameter portion 15c and the inner circumferential surface of the rotary structure 12. The spaces S2 and S3, to which the lubricant chamber 23 and the radial channel 25 are opened, are in the region where the dynamic pressure caused by the lubricant L becomes relatively low during rotation. Another radial channel 25 is opened toward a space S1 formed around a small-diameter portion 24 between the two radial bearing portions 20a and 20b. An amount of the lubricant L is of a volume corresponding to about 20% the capacity of the interior space measured from the lowermost one of the helical grooves of the bearing portion 20b to the space S2, and including the helical grooves of the bearing structure, the bearing gap G, the respective spaces, the lubricant chamber 23, and the respective channels, in which the lubricant can flow or move. Thus, when the gap Q is set to face upward, the two radial channels 25 are not closed with the lubricant L. Then, discharge of the gas becomes reliable and easy, and a rotating anode X-ray tube having a bearing structure free from lubricant leakage can be obtained.

Figure 18:
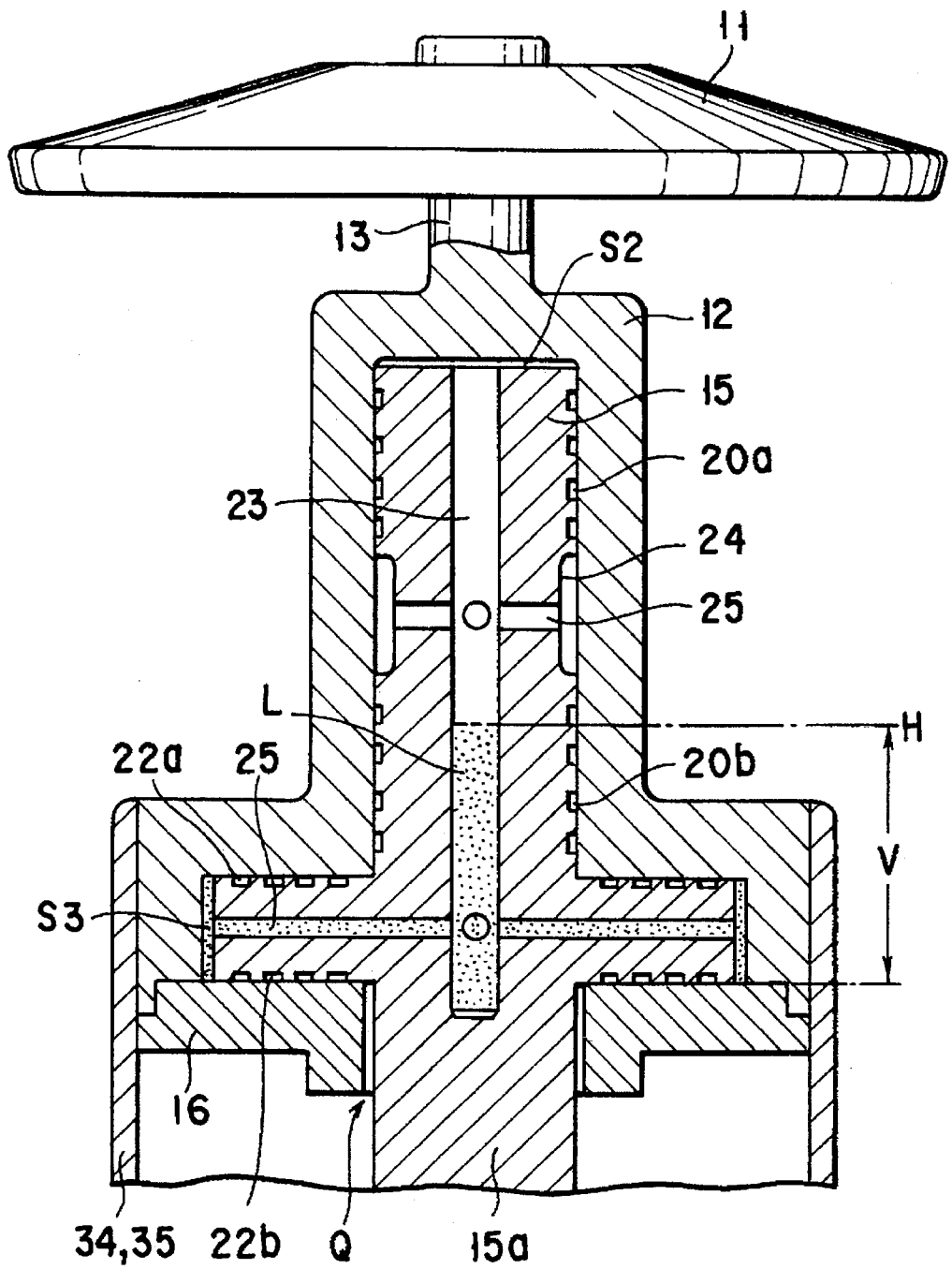
FIG. 18 is a longitudinal sectional view of a rotating anode X-ray tube according to still another embodiment of the present invention.

In still another embodiment shown in FIG. 18, two thrust bearing portions 22a and 22b are formed close to a gap Q, and two radial bearing portions 20a and 20b are formed close to a target 11. Radial channels 25 are formed between the bearing portions 20a and 20b. A lubricant L is in an interial space. An amount of the lubricant L is of a volume corresponding to about 50% the capacity of the interior space measured from the bearing portion 22b to the space S2. Then, when the gap Q is set to face upward, the radial channels 25 located between the two thrust bearing portions 22a and 22b are not closed with the lubricant L. Therefore, discharge of the gas becomes reliable and easy, and a rotating anode X-ray tube having a bearing structure free from lubricant leakage can be obtained.

The channels extending radially from the lubricant chamber may be formed at least three portions in the axial direction, and when the gap Q is set to face upward, at least one of the radial channels may be set not to be closed with the lubricant L.

As has been described above, the lower limit of the amount of the lubricant L must be an amount to fill the helical grooves and the bearing gap G in the region of this helical grooves. The upper limit of the amount of the lubricant L is of a volume corresponding to about 70% the capacity of the interior space, i.e., the interior space including the helical grooves of the bearing assembly, the bearing gaps, the respective spaces, the lubricant chamber, and the respective channels, in which the lubricant can flow or move, measured from the end portion of the helical groove bearing portion closest to the interior of the vacuum container. When the amount of the lubricant L exceeds 70% the capacity of the interior space, the emitted gas can squeeze the lubricant L out and the liquid metal can be scattered into the interior of the vacuum envelope inducing electric discharge in the X-ray tube, thereby causing a critical damage.

The upper limit of the amount of the lubricant L is preferably 50% the capacity of the interior space in which the lubricant can flow or move. More preferably, the filling amount is of a volume within a range of 20% to 50% the capacity of the interior in which the lubricant can flow.

Thin reactive layers for the body material of the bearings and the lubricant L may be formed on at least the surfaces of the slide bearings having the helical grooves and or among the respective bearing constituent members. Alternatively, thin reactive layers for the body material of the bearings and the lubricant L may be formed on the respective bearing surfaces in vacuum heating in the lubricant applying step shown in FIGS. 4 to 6 described above. In this case, it is preferable that an extra amount of lubricant is applied considering the amount consumed for formation of the reactive layers.

Furthermore, although a metal lubricant, e.g., Ga, a Ga—In alloy, or a Ga—In—Sn, mainly containing Ga can be used, the present invention is not limited to it. For example, a Bi—In—Pb—Sn alloy relatively containing a large amount of Bi, an In—Bi alloy relatively containing a large amount of In, or an In—Bi—Sn alloy can be used as the metal lubricant. Since these alloys have melting points higher than room temperature, it is preferable that the metal lubricant is preheated to a temperature higher than its melting point before the anode target is rotated.

As has been described above, according to the present invention, even if gas emission from the bearing constituent members and the liquid metal lubricant occurs, gas pressure is reduced in the spaces, and gas bubbles can be reliably and easily discharged from the bearing portions, so that lubricant leakage can be prevented, thereby obtaining a rotating anode X-ray tube capable of maintaining stable bearing operation.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A method of manufacturing a rotating anode X-ray tube, comprising the steps of:

providing an anode structure having a rotary axis and an anode target;

providing a rotary structure to which the anode target is fixed and a stationary structure for rotatably supporting the rotary structure, one of the rotary and stationary structures having an opening;

injecting a liquid metal lubricant having a predetermined volume through the opening into one of the rotary and stationary structures;

applying liquid metal lubricant to dynamic pressure type bearing sections having helical grooves and bearing gap and positioned between said rotary and stationary structures and to a reservoir communicated with said bearing sections and formed in one of said rotary and stationary structures, the predetermined volume of the liquid metal lubricant being within a range of 20% to 70% of the total volume of the bearing sections and reservoir;

closing the opening in one of the rotary and stationary structures so as to have a small gap in a liquid tight state;

locating the anode structure in an envelope and arranging a cathode so as to oppose the anode target in the envelope;

evacuating the envelope;

repeatedly changing the posture of the X-ray tube between a vertical position in which the rotary axis set to be vertical and an inclined position in which the rotary axis is set to be either horizontal or inclined during the evacuation of the X-ray tube;

energizing said X-ray tube to rotate the rotary structure and cause the cathode to emit an electron beam to land on the anode target during the evacuation of the X-ray tube; and sealing the envelope.

2. A method of manufacturing according to claim 1, wherein said inclining step includes a step of rotating the rotary structure in the evacuated envelope.

3. A method of manufacturing according to claim 1, further comprising a step of rotating said rotary structure in the evacuated envelope and stopping the rotation of the rotary structure, repeatedly.

4. A method of manufacturing a rotating anode X-ray tube, according to claim 1, wherein said locating step further includes a step of arranging the X-ray tube such that the opening between the rotary and stationary structures faces upward, said evacuating step includes a step of connecting an evacuating unit to the vacuum envelope, a step of arranging the stationary structure and a corresponding part of the envelope in an electromagnet, and a step of starting evacuation of the envelope and energizing the electromagnet to shift the rotary structure, and a step of heating the envelope.

* * * * *